United States Patent
Lat et al.

(10) Patent No.: US 6,273,974 B1
(45) Date of Patent: Aug. 14, 2001

(54) SELECTED HEAT TREATMENT AND HARDENING METHOD FOR NAILS

(75) Inventors: Geronimo E. Lat, Ivanhoe; Louis M. Spoto, Sleepy Hollow; Kent B. Godsted, Grayslake, all of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/571,633

(22) Filed: May 15, 2000

Related U.S. Application Data

(63) Continuation of application No. 09/229,527, filed on Jan. 13, 1999, now Pat. No. 6,086,305.

(51) Int. Cl.[7] ............................................. C21D 9/00
(52) U.S. Cl. ........................ 148/639; 148/642; 148/644
(58) Field of Search ............................ 148/642, 644, 148/639

(56) References Cited

U.S. PATENT DOCUMENTS

| | | | |
|---|---|---|---|
| 1,462,775 | 7/1923 | Trivelloni | 411/480 X |
| 1,767,653 | 6/1930 | Davis | 411/900 X |
| 2,086,801 | 7/1937 | Hayden | 148/10 |
| 2,224,659 | 12/1940 | Stoll | 10/10 |
| 2,229,565 | 1/1941 | Hallowell, Jr. | 85/9 |
| 2,590,585 | 3/1952 | Temple | 411/440 X |
| 3,090,712 | 5/1963 | Berry | 148/146 |
| 3,301,120 | 1/1967 | Loyd | 85/1 |
| 3,344,817 | 10/1967 | Connard | 148/12.1 |
| 3,376,780 | 4/1968 | Tanczyn | 85/48 |
| 3,765,660 | 10/1973 | Taylor et al. | 266/6 R |
| 3,769,103 | 10/1973 | Wardwell et al. | 148/147 |
| 3,983,304 | 9/1976 | Sekhon | 428/460 |
| 4,021,274 | 5/1977 | Chadwick | 148/146 |
| 4,289,006 | 9/1981 | Hallengren | 72/38 |
| 4,295,351 | 10/1981 | Bjorklund et al. | 72/38 |
| 4,385,081 | 5/1983 | Keller et al. | 427/80 |
| 4,486,248 | 12/1984 | Ackert et al. | 148/145 |
| 4,583,898 | 4/1986 | Sygnator | 411/387 |
| 4,670,310 | 6/1987 | Tengqvist | 427/388.4 |
| 4,690,837 | 9/1987 | Doroszkowski et al. | 427/314 |
| 4,702,880 | 10/1987 | Porowski et al. | 376/305 |
| 4,730,970 | 3/1988 | Hyner et al. | 411/387 |
| 4,835,819 | 6/1989 | Duffy et al. | 427/195 |
| 4,842,655 | 6/1989 | Porowski et al. | 148/130 |
| 4,842,890 | 6/1989 | Sessa et al. | 427/47 |
| 4,877,463 | 10/1989 | Aicher et al. | 148/12 B |
| 5,033,181 | 7/1991 | Lat et al. | 29/433 |
| 5,120,175 | 6/1992 | Arbegast et al. | 411/501 |
| 5,178,903 | 1/1993 | Lat et al. | 427/446 |
| 5,283,280 | 2/1994 | Whyte et al. | 524/559 |
| 5,302,068 | 4/1994 | Janusz et al. | 411/402 |
| 5,403,624 | 4/1995 | DiMaio et al. | 427/421 |
| 5,417,776 | 5/1995 | Yoshino et al. | 148/318 |
| 5,484,244 | 1/1996 | Glovan et al. | 411/424 |
| 5,498,659 | 3/1996 | Esser | 524/549 |

(List continued on next page.)

FOREIGN PATENT DOCUMENTS 51-1096721-A * 8/1976 (JP).
61-106713-A * 5/1986 (JP).

OTHER PUBLICATIONS

Marketing brochure of Elco Industries, Inc., entitled "DRIL-–FLEX, A New Concept In Structural Fastening", dated Feb. 1989.

*Primary Examiner*—Deborah Yee
(74) *Attorney, Agent, or Firm*—Pauley Peterson Kinne & Fejer

(57) ABSTRACT

A selectively hardened nail includes a nail head, an elongated shank, and a tip. A portion of the nail shank is made harder than the remainder by selectively heat treating that portion, and cooling it. The nail has controlled bending properties. The selectively hardened portion does not significantly bend when the nail is fired at a surface using a power driving tool, or during use of the nailed object.

20 Claims, 2 Drawing Sheets

U.S. PATENT DOCUMENTS

| | | | |
|---|---|---|---|
| 5,536,582 | 7/1996 | Prasad et al. | 428/450 |
| 5,564,876 | 10/1996 | Lat | 411/439 |
| 5,605,423 | 2/1997 | Janusz | 411/387 |
| 5,605,722 | 2/1997 | Esser | 427/388.4 |
| 5,605,952 | 2/1997 | Esser | 524/522 |
| 5,605,953 | 2/1997 | Esser | 524/522 |
| 5,609,965 | 3/1997 | Esser | 428/522 |
| 5,614,262 | 3/1997 | Joesten | 427/318 |
| 5,616,367 | 4/1997 | Spearin et al. | 427/532 |
| 5,618,372 | 4/1997 | Erdrich et al. | 156/310 |
| 5,655,969 | 8/1997 | Lat | 470/5 |
| 5,730,570 | 3/1998 | Buhofer et al. | 411/440 X |
| 5,755,542 | 5/1998 | Janusz et al. | 411/387 |

\* cited by examiner

SELECTED HEAT TREATMENT AND HARDENING METHOD FOR NAILS

CROSS REFERENCE TO RELATED APPLICATION

This application is a continuation of patent application Ser. No. 09/229,527, filed on Jan. 13, 1999, now U.S. Pat. No. 6,086,305.

FIELD OF THE INVENTION

This invention relates to nails and similar elongated fasteners having portions selectively hardened to create desired properties and behavior, and a method of making the selectively hardened nails.

BACKGROUND OF THE INVENTION

Various techniques are known for treating the surfaces of nails and similar elongated fasteners. U.S. Pat. Nos. 5,655,969 and 5,564,876, both issued to Lat, disclose nails manufactured from carbon steel wire pre-coated with a protective metallic layer having corrosion resistant properties. The nails also have a protective corrosion-resistant cap. U.S. Pat. No. 5,178,903, issued to Lat et al., discloses coating a nail with zinc, followed by a polyurethane resin.

U.S. Pat. No. 4,486,248, issued to Ackert et al., discloses wear-resistant railroad rails produced by controlled forced cooling from above the austenite transition temperature, to yield a fine perlite metallurgical structure in the head portions of the rails.

One type of nail used in the construction industry is a positive placement nail. Positive placement nails are typically driven with a high powered driving tool to hold a 12-gauge or other steel plate to wood. The nails are driven through holes present in the steel plate, and into the wood. This construction method is used for building foundations, floor joists, and roofing. Some positive placement nails are hardened in a batch process to improve their strength. This process, which involves heat treating and hardening the entire length of the nail, is expensive and time consuming, and difficult to control.

The holes in the steel plate may only be slightly larger than the shank diameter of the nail, and are smaller than the head diameter of the nail. When the nails miss the holes and hit the steel plate at high speed, they become bent or distorted at the contact end and ricochet. Nails which ricochet create obvious hazards for the tool operator and others in the area.

Pallet nails used in the crating and construction industries hold pallets together. Pallet nails are generally long and thin so as not to split the hardwood boards of the pallet. A pallet nail with a larger shank diameter has a greater tendency to split the pallet boards during driving than a nail with a smaller shank diameter. If a pallet nail is too thin, it bends easily, especially at the junction between the top pallet board and the skid, which is typically about 0.5 inch below the nail head. This bending often occurs during severe service of a pallet, when the fork lift bumps into the side of the pallet creating stress between a pallet board and skid. It has been difficult to develop a pallet nail which minimizes board splitting and resists bending.

SUMMARY OF THE INVENTION

The present invention provides nails which are hardened only at selected locations for the purpose of improving performance in their specialized use. In one embodiment, only the pointed end and lower shank portion of the nail is made harder than the upper portion of the shank. In another embodiment, a central region of an elongated nail shank is made harder than portions of the shank above and below the region. Other embodiments are also contemplated.

The selective hardening is accomplished by heating a portion of the nail to a temperature higher than about 1400° F., and then quenching (i.e. rapidly cooling) it. The selective heating causes that portion of the nail to transform from a ferritic pearlitic structure to an austenitic structure. The quenching transforms the austenitic structure to a martensitic structure, which is harder and less ductile than the untreated structure. The untreated portion of the nail has a ferritic pearlitic structure, which is softer and more ductile. The treated portion of the nail is more resistant to bending.

DETAILED DESCRIPTION OF THE PRESENTLY PREFERRED EMBODIMENTS

Figure 1:
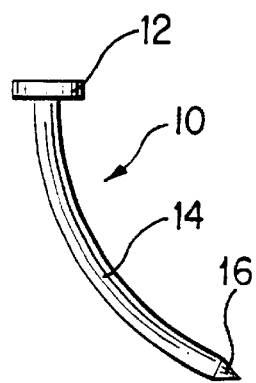
FIG. 1 illustrates a positive placement nail of the prior art, bent because of firing into a portion of a steel plate without a hole.

FIG. 1 illustrates a positive placement nail 10 of the prior art, having a head portion 12, an elongated shank 14, and a tip 16. These nails are typically driven into wood and other foundation materials through narrow pre-formed holes in a support plate made of relatively heavy (e.g. 12-gauge) steel, or a similar heavy metal material. The holes in the support plate are slightly larger than the diameter of nail shank 14, and smaller than the diameter of head 12. The nails 10, which are fired using a power driving tool, may miss the openings and strike the steel plate. When this happens using a typical, non-hardened nail, the tip of the nail is not hard enough to penetrate the steel. The shank 14 may bend in a semi-circular fashion as shown in FIG. 1, and the nail 10 may ricochet or skip at high speed, creating a hazardous working environment. In some prior art nails, to make the tips sufficiently hard to penetrate the steel, the entire nails were hardened in an expensive, time-consuming off-line batch process.

Figure 2:
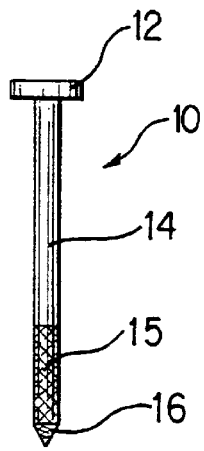
FIG. 2 illustrates a positive placement nail of the invention, whose lower end is selectively hardened.

FIG. 2 illustrates a positive placement nail 10 of the invention in which the lower portion 15 (including part of shank 14 and the tip 16) have been selectively hardened. The selective hardening is accomplished by selectively heating the lower portion 15 to a temperature of at least about 1400° F., preferably about 1500–2000° F., most preferably about 1600–1800° F., and then quenching (rapidly cooling) the nail. The selective heating causes the heated portion of the nail, which is typically made of carbon steel, to transform from a ferritic pearlitic metallurgical structure to an austenitic metallurgical structure.

The heated nail is quenched using an aqueous bath or spray, an air-assisted spray or another suitable quenching medium. The quenching causes the previously heated portion 15 to transform from an austenitic metallurgical structure to a martensite structure, which is harder and less ductile than the original structure. The nail may be quenched by dipping or dropping the entire nail into the quenching fluid, or by aiming the quenching fluid at the nail or at only the heated portion of the nail. The temperature of the quenching fluid is desirably about 40–200° F., preferably about 50–150° F., more preferably about 60–100° F. Tap water or other process water is a suitable quenching medium. Other quenching media can also be employed, including without limitation process oil. The quenching time need not be more than about 30 seconds, and is preferably about 3–10 seconds. The nails may still be warm (up to 800° F.) after removal from the quenching medium, in order to facilitate drying.

The resulting selectively treated nail has different hardnesses at different axial positions along the nail. The nail has a lower shank portion 15 (including tip 16) which is harder at that axial position than the remainder of the shank 14 at other axial positions. The selectively hardened axial portion may have a Rockwell "C" ("$R_C$") hardness value of at least about 45, preferably at least about 50, more preferably at least about 55. The remaining axial portion of shank 14 may have an $R_C$ value at least about 10 units lower than the $R_C$ value of the hardened portion 15. Desirably, the untreated axial portion of shank 14 may have an $R_C$ value of about 35 or less.

The axial portion 15 of the nail which is selectively hardened (including the tip 16) may have a length of about 0.10–1.0 inch, preferably about 0.25–0.80 inch, more preferably about 0.50–0.70 inch. The nail 10 may have an overall shank length (including tip) of at least about 1.25 inch, preferably at least about 1.5 inch, more preferably about 1.75–3.50 inch. Preferably, the length of the selectively hardened axial portion 15 (including tip 16) will not exceed 50% of the total length of shank 14 (including tip 15), in order to reduce the energy cost compared to conventional methods of heat treating an entire nail.

The nail 10 may be constructed of carbon steel or another hardenable material. The carbon steel may have a carbon content of about 0.08–0.50% by weight. Carbon steel having a carbon content of about 0.15–0.45% by weight is desirable, with a range of about 0.20–0.40% being preferred for the positive placement construction nails.

Figure 3A:
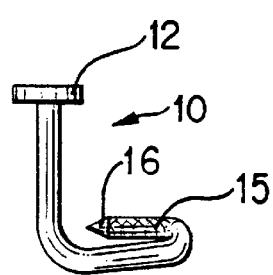
FIG. 3 illustrates how the positive placement nail of FIG. 2 may bend when fired into a portion of a steel plate without a hole.
Figure 3B:
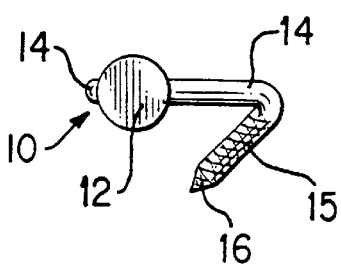

The selectively hardened positive placement nail 10 of the invention exhibits a controlled bending when misfired into a solid portion of a steel support plate. This controlled bending is illustrated in FIGS. 3(a) and 3(b). The selectively hardened nail 10 does not assume the semi-circular configuration associated with prior art non-hardened nails that ricochet when misfired. Instead, when the selectively hardened nail 10 strikes a solid steel plate at high speed, the lower hardened portion 15 is sufficiently hard to penetrate the steel, and remains substantially straight and free of bending. The nail shank 14 bends sharply in at least one location, and possibly two locations, in the softer portion above the hardened portion 15. The energy and momentum of the misfired nail is absorbed into the sharp bending of the softer portion of the nail shank.

In contrast, the shank of a fully hardened prior art nail will not bend. If a fully hardened nail is misfired into the steel plate, the nail may only partially penetrate, causing the tool to bounce back or recoil due to additional stress created. The partially hardened nail of the invention also reduces or eliminates the ricocheting of misfired non-hardened nails, resulting in a safer working environment.

The selectively hardened nail also exhibits better holding force during shear than a nail which is completely heat treated and hardened. When a shear force is applied to move the above-mentioned steel cover plate laterally along the surface of the wooden substrate, or vice versa, the selectively heat treated nail may bend in the non-hardened regions. The holding power of the nail is maintained because the top portion of the nail is not disturbed, and stays in full contact with wood to aid in holding against the shear force. A fully hardened nail, by comparison, cannot readily bend. Accordingly, the entire length of the nail is released from the wood when the shear force causes enlargement of the nail hole.

Figure 4:
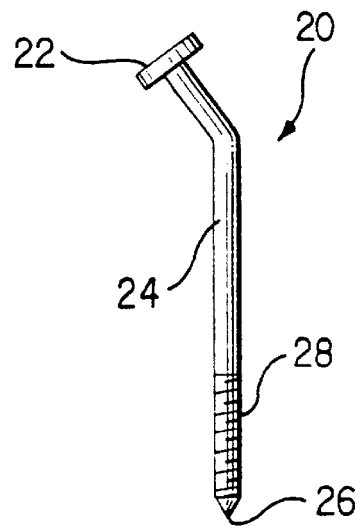
FIG. 4 illustrates a pallet nail of the prior art, bent at its upper end between the top pallet board and the skid, because of severe service of the pallet.

FIG. 4 illustrates a pallet nail 20 of the prior art, having a head portion 22, an elongated shank 24, and a tip 26. These nails are typically driven into hardwood boards used to make pallets and crating. These types of wood boards have a propensity for splitting. Pallet nails are typically long and narrow, and typically have one or more threaded regions 28. The nails must have enough length and column strength to adequately penetrate the wood, yet be small enough in diameter so as not to split the pallet boards during driving. A common problem with pallet nails is that they sometimes bend about 0.5 inch below the head portion during abuse of the pallet, as shown in FIG. 4. This bending results from stress at the junction between a pallet board and adjacent skid, and renders the nails less effective for maintaining the integrity of the pallet.

Figure 5B:
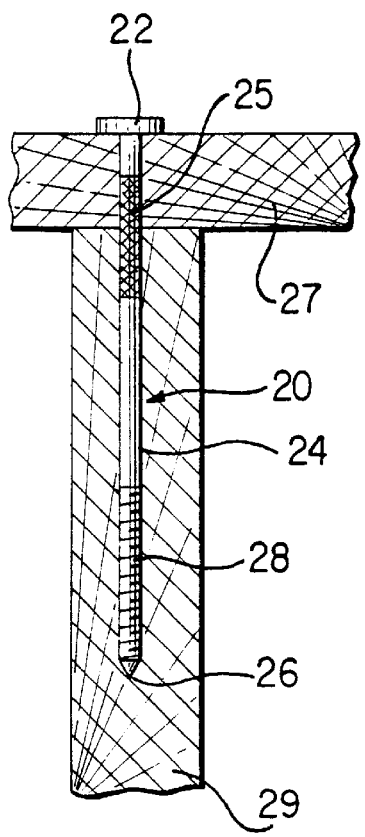
FIG. 5(b) illustrates another embodiment of a pallet nail of the invention, having a selectively hardened portion below its upper end, to prevent bending when stress is applied between a pallet board and adjacent skid.
Figure 5A:
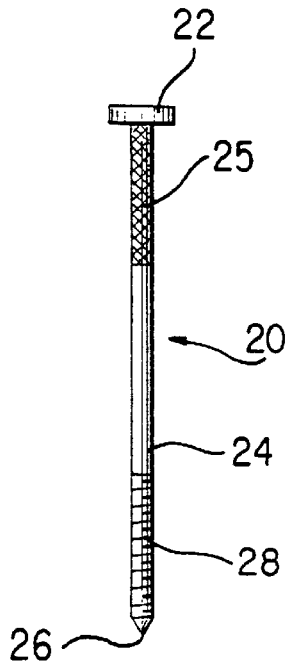
FIG. 5(a) illustrates a pallet nail of the invention, having an upper portion selectively hardened.

In order to strengthen the pallet nails in the regions which typically bend, the selective hardening technique described above may be applied to the upper axial portions of the pallet nails. FIG. 5(a) illustrates one embodiment of a pallet nail in which an upper region 25 of the shank 24, extending below the head 22, has been selectively heat treated and hardened. FIG. 5(b) illustrates another embodiment in which the selectively heat treated and hardened region 25 is located at a distance centered about 0.5 inch below the head 22, but still in the upper portion of shank 24. In FIG. 5(b), the intermediate hardened region 25 has untreated softer regions above and below on the shank 24. As shown in FIG. 5(b), the hardened region 25 corresponds to the junction between a typical pallet board 27 and adjacent stringer board 29.

The process for making the selectively heat treated pallet nails is essentially the same as for the selectively heat treated positive placement nails, described above, with the main difference being that the heat treatment is applied to different regions on the nails. The heating temperatures and quenching techniques are substantially the same, but may vary depending on various parameters such as the desired hardness of the resulting nail part or the carbon content of the steel. The pallet nails 20 may also be constructed from carbon steel or another suitable material. Carbon steel having a carbon content of about 0.08–0.50% by weight is useful, while a range of about 0.15–0.45% is desirable, and a range of about 0.18–0.35% is preferred for the pallet nails.

Again, the treated axial region 25 should have a Rockwell "C" ("$R_C$") hardness at least about 10 units higher than the $R_C$ values of the untreated axial region or regions on the shank 24. For instance, the treated region 25 may have an $R_C$ value of at least about 40, preferably at least about 45, more preferably at least about 50. The untreated region or regions may have an $R_C$ value of about 35 or less.

Pallet nails typically range from about 1.25–3.50 inches in length. The diameters are typically narrow, and range between about 0.075–0.150 inches. By providing selectively hardened pallet nails that will not bend near the top during pallet use, the pallet nails can be provided with smaller shank diameters without sacrificing other desirable properties, such as bending resistance. This not only permits cost savings, but also improves the nail performance because smaller diameter pallet nails are less likely to split the wooden substrate, and are easier to fully drive into the substrate.

Referring to FIGS. 5(a) and 5(b), the selectively hardened region 25 may have a length of about 0.20–1.0 inch, preferably about 0.30–0.75 inch, more preferably about 0.40–0.60 inch. The selectively hardened portion 25 may commence just below the head 22 (FIG. 5(a)), or within about 0.40 inch down from the head 22 (FIG. 5(b)). Preferably, the selectively hardened portion 25 commences about 0.20–0.30 inch below the head 22.

Figure 6:
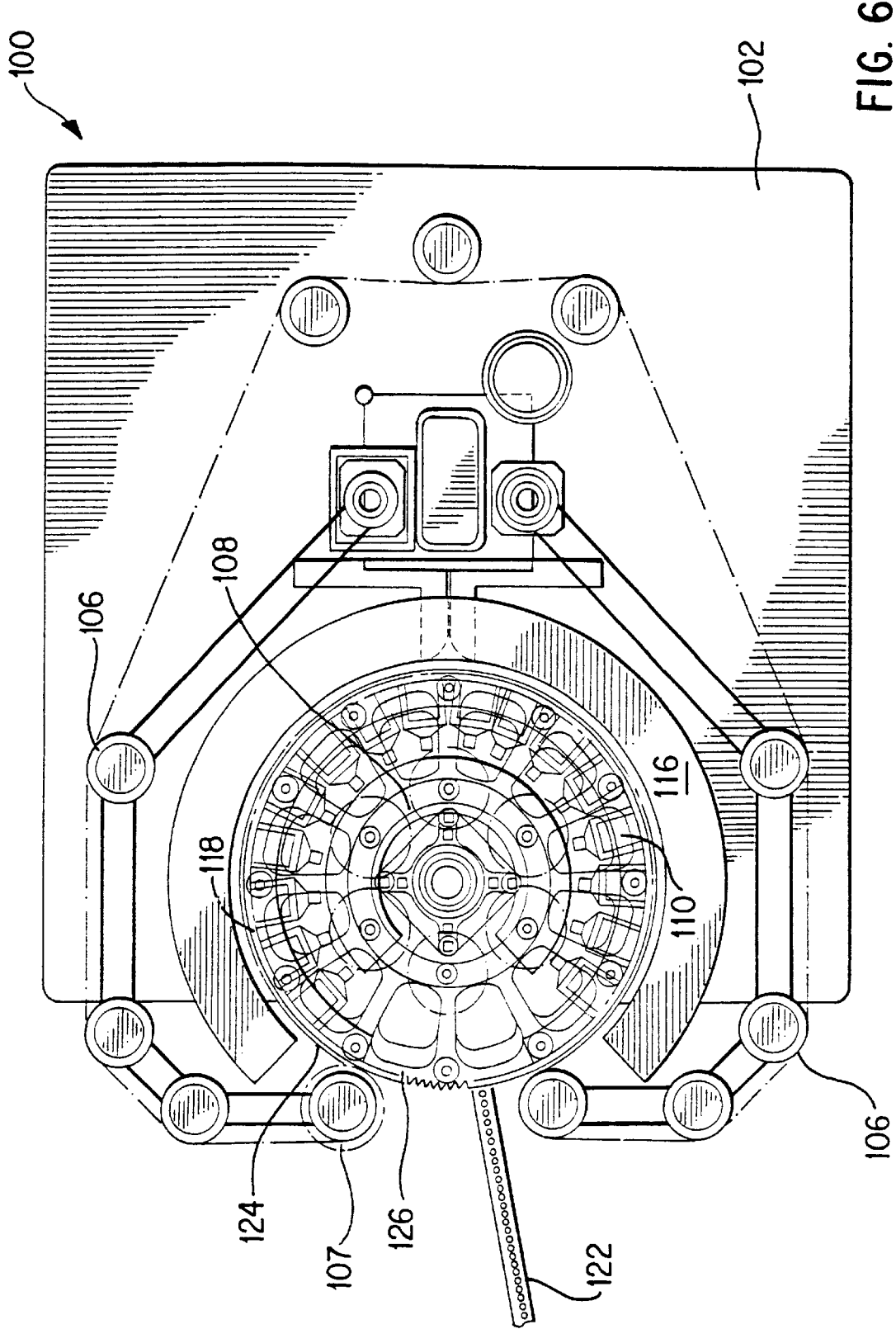
FIG. 6 is a top view of a heating apparatus for making selectively hardened nails.

FIG. 6 schematically illustrates an apparatus 100 useful for heat treating selected axial portions of a large number of nails on a continuous basis. Flammable gas from a source (not shown) enters the apparatus and is injected into a semi-circular manifold 108 located on a base 102. Firing burners 110 receive flammable gas from the manifold 108. Firing burners 110 each include a nozzle which fires burning gas outward toward a semi-circular exhaust chamber 116.

A central disk 118 having a toothed outer periphery is rotated immediately above the firing burners 110. A chain 124 is located radially outward of the disk during rotation of the disk for approximately 270°. The chain 124 and outer periphery of disk 118 travel at the same speed and hold nails 30 in a substantially vertical orientation in front of burners 110. When not in contact with disk 118, the chain 124 passes around a series of sprockets remote from the disk.

The nails 30 enter the furnace via inlet conveyor 122, whereupon they are inserted into openings between disk 118 and chain 124, and are captured between the disk and chain. As the disk 118 travels in the circular path, a selected portion of each nail 30 is exposed to, and heated by the burners 110. After passing the last burner 110, the nails 30 pass to the exit chamber 126, whereupon they are ejected and quenched. In a preferred embodiment, nails 30 are dropped into a bath of turbulent water where they are quenched for a short time, and then removed for further processing.

The carrier disk 118 and chain 124 may define over 100, and possibly several hundred linkage openings. Thus, the apparatus 100 may selectively heat a large number of nails on a continuous basis, to very high temperatures. By varying the size and positions of the burners 110, the apparatus 100 can be used to heat select narrow portions of the nails, or wider portions, and may be used to heat upper, lower or intermediate portions.

While the embodiments of the invention disclosed herein are presently considered preferred, various modifications and improvements can be made without departing from the spirit and scope of the invention. For instance, the selective hardening may be advantageously employed in other fastener types, including without limitation corrugated fasteners, framing nails, steel stud nails, and staples. The scope of the invention is indicated by the appended claims, and all changes that fall within the meaning and range of equivalents are intended to be embraced therein.

We claim:

1. A method for selectively hardening a nail, comprising the steps of:
    providing a nail including a nail head, an elongated shank and a tip, the elongated shank having a Rockwell "C" hardness of not more than about 35;
    transporting the nail to a heating assembly;
    selectively heating an upper part of the nail shank below the nail head to a temperature of at least about 1400° F.; and
    applying a quenching fluid to provide a selectively hardened nail.

2. The method of claim 1, wherein the upper part of the nail shank below the head is selectively heated to about 1500–2000° F.

3. The method of claim 1, wherein the upper part of the nail shank below the head is heated to about 1600–1800° F.

4. The method of claim 1, wherein the quenching fluid comprises water.

5. The method of claim 1, wherein the selective heating is accomplished by selectively applying aflame to the upper part of the nail shank below the nail head.

6. The method of claim 1, wherein the selectively hardened nail has a Rockwell "C" hardness of at least about 45 in the upper part of the shank and not more than about 35 in a lower part of the shank.

7. A method for selectively hardening a nail, comprising the steps of:
    providing a nail including a nail head, an elongated shank and a tip, the elongated shank having a Rockwell "C" hardness of not more than about 35;
    transporting the nail to a heating assembly;
    selectively hardening an intermediate part of the nail shank to a temperature of at least about 1400° F.; and
    applying a quenching fluid to provide a selectively hardened nail.

8. The method of claim 7, wherein the intermediate part of the nail shank is selectively heated to about 1500–2000° F.

9. The method of claim 7, wherein the intermediate part of the nail shank is selectively heated to about 1600–1800° F.

10. The method of claim 7, wherein the quenching fluid comprises water.

11. The method of claim 7, wherein the selective heating is accomplished by selectively applying a flame to the intermediate part of the nail shank.

12. The method of claim 7, wherein the selectively hardened nail has a Rockwell "C" hardness of at least about 45 in the intermediate part of the nail shank and not more than about 35 in other parts of the nail shank.

13. A method of selectively hardening a nail including a nail head, an elongated shank and a tip, comprising the steps of:
    heating an axial part of the nail shank to at least about 1600° F. without so heating other axial parts of the nail shank; and
    quenching the axial part of the nail shank that was heated.

14. The method of claim 13, wherein a lower axial part of the nail shank and the tip are selectively heated.

15. The method of claim 13, wherein an upper axial part of the nail shank is selectively heated.

16. The method of claim 13, wherein an intermediate axial part of the nail shank is selectively heated.

17. A method of selectively hardening a nail including a nail head, an elongated shank and a tip having a ferritic pearlitic metallurgical structure, comprising the steps of:
    selectively heating part of the nail to transform it to an austenitic metallurgical structure; and
    quenching the part that was selectively heated to transform it to a martensite metallurgical structure.

18. The method of claim 17, wherein an upper part of the nail shank is selectively heated.

19. The method of claim 17, wherein an intermediate part of the nail shank is selectively heated.

20. The method of claim 17, wherein a lower part of the nail shank is selectively heated.

* * * * *